(12) United States Patent
Sun et al.

(10) Patent No.: US 11,731,280 B2
(45) Date of Patent: Aug. 22, 2023

(54) CABLE TRENCH INSPECTION ROBOT

(71) Applicants: STATE GRID ANHUI ELECTRIC POWER RESEARCH INSTITUTE, Anhui (CN); State Grid Corporation of China, Beijing (CN)

(72) Inventors: Tao Sun, Anhui (CN); Minghao Fan, Anhui (CN); Jiaqing Zhang, Anhui (CN); Jia Xie, Anhui (CN); Bo Yan, Anhui (CN); Daoyou Huang, Anhui (CN); Songyuan Cao, Anhui (CN); Liangpeng Ye, Anhui (CN)

(73) Assignees: STATE GRID ANHUI ELECTRIC POWER RESEARCH INSTITUTE, Hefei (CN); State Grid Corporation of China, Beijing (CN)

( * ) Notice: Subject to any disclaimer, the term of this patent is extended or adjusted under 35 U.S.C. 154(b) by 105 days.

(21) Appl. No.: 17/622,227

(22) PCT Filed: Aug. 20, 2021

(86) PCT No.: PCT/CN2021/113856
§ 371 (c)(1),
(2) Date: Dec. 22, 2021

(87) PCT Pub. No.: WO2021/259387
PCT Pub. Date: Dec. 30, 2021

(65) Prior Publication Data
US 2022/0347854 A1 Nov. 3, 2022

(30) Foreign Application Priority Data
Jun. 23, 2020 (CN) .......................... 202010581023.1

(51) Int. Cl.
*B25J 9/02* (2006.01)
*B25J 11/00* (2006.01)
(Continued)

(52) U.S. Cl.
CPC ............... *B25J 11/00* (2013.01); *B25J 5/005* (2013.01); *B25J 19/023* (2013.01)

(58) Field of Classification Search
None
See application file for complete search history.

(56) References Cited

U.S. PATENT DOCUMENTS

| | | | |
|---|---|---|---|
| 5,350,033 A * | 9/1994 | Kraft | B25J 9/0003 180/6.58 |
| 11,135,721 B2 * | 10/2021 | Bryner | G01C 7/04 |

(Continued)

FOREIGN PATENT DOCUMENTS

| | | |
|---|---|---|
| CN | 107046252 A | 8/2017 |
| CN | 207691316 U | 8/2018 |
| CN | 212763474 U | 3/2021 |

OTHER PUBLICATIONS

Sun et al., A climbing robot for inspection of lamppost in the airport: Design and preliminary experiments, 2017, IEEE, p. 436-441 (Year: 2017).*

(Continued)

*Primary Examiner* — McDieunel Marc

(57) ABSTRACT

A cable trench inspection robot. The cable trench inspection robot includes a base spreading system, and a camera lifting system disposed on the base spreading system, where the base spreading system includes a base plate, a linear action unit, a cantilever plate, a walking assembly, and a jacking assembly, and the camera lifting system includes a travel block, an imitated four-bar assembly, a support rod, and a camera assembly. Such inspection can realize a through-wall operation by using a cable trench, thereby avoiding many use problems caused by a firewall, and efficiently completing a predetermined inspection task.

14 Claims, 17 Drawing Sheets

(51) Int. Cl.
*B25J 5/00* (2006.01)
*B25J 19/02* (2006.01)

(56) References Cited

U.S. PATENT DOCUMENTS

| 11,518,030 | B2* | 12/2022 | Bryner | B62D 57/02 |
| 2008/0087112 | A1* | 4/2008 | Bagley | G01N 29/265 |
| | | | | 322/99 |
| 2020/0024853 | A1* | 1/2020 | Furrer | E04F 21/22 |
| 2021/0071781 | A1* | 3/2021 | Ramsay | B23K 37/027 |

OTHER PUBLICATIONS

Xu et al., Design and application of a new wheel-based cable inspection robot, 2011, IEEE, p. 4909-4914 (Year: 2011).*
Du et al., Progresses in study of pipeline robot, 2012, IEEE, p. 808-813 (Year: 2012).*
Savall et al., Two compact robots for remote inspection of hazardous areas in nuclear power plants, 1999, IEEE, p. 1993-1998 (Year: 1999).*

* cited by examiner

CABLE TRENCH INSPECTION ROBOT

TECHNICAL FIELD

The present disclosure relates to the technical field of cable inspection, and specifically, to a cable trench inspection robot.

BACKGROUND

The occurrence of a cable tunnel fire is a gradual accumulation process. With increasing time, local temperature of a cable gradually rises due to aging of an insulating layer, accumulation of dust and oil, loosening of an intermediate joint, and other reasons, resulting in a fire. Before an accident occurs, if temperature and smoke inside a cable tunnel can be effectively monitored in real time, the fire can be prevented. Although the monitoring of the cable tunnel has attracted people's attention for a long time, no proper and reasonable solution is found.

Traditionally, the cable tunnel is inspected manually. At regular intervals, an inspector enters the tunnel and manually checks temperature of an intermediate joint of the cable by using a temperature measuring instrument. This manner wastes a lot of manpower. In addition, due to limitations of the manual manner, it is difficult to detect each intermediate joint every time. In this manual manner, only a place with a rapid temperature rise can be checked, failing to prevent a possible accident and play a preventive role.

Later, the cable is monitored online by using a thermal sensing line and a monitoring system. Specifically, a thermal sensing line extends against the cable along a cable layout direction, to detect a high-temperature point. However, the thermal sensing line has the following defects: Cables on both sides of the cable tunnel are laid in bundles. Therefore, the thermal sensing line can only monitor a high temperature change of a cable close to the thermal sensing line, while a monitoring effect of a temperature change of a cable farthest away from the thermal sensing is very poor. In addition, the thermal sensing line is often wavy due to its stiffness and elasticity, so it is difficult to make the thermal sensing line against the cable during layout. As a result, even a cable close to the thermal sensing line still has a monitoring loophole due to an uneven gap between the thermal sensing line and the cable.

Then, a tunnel inspection robot becomes popular. A specific mechanism of the tunnel inspection robot has been described in the invention patent application with announcement No. CN107046252A and entitled "Intelligent Cable Trench Inspection Robot" and the utility model patent application with announcement No. CN207691316U and entitled "Robot Inspection System for Cable Trench". The tunnel inspection robot mainly includes a body and a crawler belt for the body to move. The crawler belt is installed on each side of a downside of the body and powered by a battery. The body is provided with a control system and a control gimbal. The control system includes a main controller and a transmit antenna communicatively connected to the main controller. The control gimbal includes a high-definition camera and a thermal imager that are communicatively connected to the main controller. The tunnel inspection robot transmits a picture showing a working status of a cable in a tunnel, temperature and humidity in the tunnel, surface temperature of the power cable, and other parameters to a technician outside the tunnel in real time by using a wireless network. When these status parameters are abnormal, the technician outside the tunnel can determine that there is a potential safety hazard in the power cable in a place where the robot is located, such that related personnel can be organized to repair the corresponding part. The tunnel inspection robot has achieved an excellent effect, but there are still the following problems that cannot be resolved: On one hand, when cables are assembled in the cable tunnel, considering the fire, a thick firewall is poured every specified length in the cable tunnel, to divide the cable tunnel into tunnel units to achieve physical isolation in case of fire. When the tunnel inspection robot performs inspection each time, the firewall makes it necessary to repeatedly take out the tunnel inspection robot from a previous tunnel unit, reset a cover plate of the previous tunnel unit, remove a cover plate of a new tunnel unit, and then put the tunnel inspection robot into the new tunnel unit. The operation is extremely complex and consumes huge physical labor, seriously restricting actual inspection efficiency. On the other hand, as described above, the cables in the cable tunnel are laid in bundles, so there is a certain height. The traditional tunnel inspection robot has a constant inspection height, and inevitably fails to inspect some cables, resulting in inspection loopholes and potential safety hazards.

SUMMARY

To overcome the shortcomings in the prior art, the present disclosure provides a structurally reasonable and practical cable trench inspection robot. The cable trench inspection robot can realize a through-wall operation by using a cable trench, thereby avoiding many use problems caused by a firewall, and efficiently completing a predetermined inspection task.

To achieve the above objective, the present disclosure uses the following technical solution:

A cable trench inspection robot includes a base spreading system, and a camera lifting system disposed on the base spreading system, where the base spreading system includes a base plate and a linear action unit arranged in parallel on the base plate, and of the linear action unit includes two moving blocks that can be driven by a power source to move towards and away from each other along a length direction of the base plate; each of the moving blocks is hinged with a fixed end of a cantilever plate by using a first vertical hinge shaft, a cantilever end of the cantilever plate is hinged with a walking portion by using a second vertical hinge shaft, and walking portions on a same side of the base plate are securely connected to each other to form a group of walking assemblies; the cantilever plate is further provided with a vertical pillar, a position of the vertical pillar is spaced from a position of the first vertical hinge shaft, an upper surface of the base plate is provided with a concave guide sliding slot, there is an included angle between a length direction of the guide sliding slot and an action path of the moving block, and a corner tip of the included angle points to a moving direction when the moving blocks move away from each other; and the base spreading system further includes a jacking assembly for jacking the walking assembly from a cable trench to a height higher than or equal to a ground level of a cable tunnel; and the camera lifting system includes a linear displacement unit, and the linear displacement unit includes a travel block disposed on a top plate and capable of performing a reciprocating linear displacement along a length direction of the cable trench; the camera lifting system further includes an imitated four-bar assembly, and a bottom end of a first rocker of the imitated four-bar assembly extends downward and forms a hinged fit with the travel block; a bottom end of a first connecting rod is securely connected to an end portion, of the top plate, behind the travel block, and a top end of the first connecting rod extends forward and forms a hinged fit with a bottom end of a support rod; a top end of the first rocker is hinged with a first sliding sleeve, and a sliding rail of the first sliding sleeve is equipped on the first connecting rod; a tail end of a second connecting rod is hinged on a middle portion of the first rocker, a top end of the second connecting rod is hinged on a bottom end of a second rocker, a top end of the second rocker is hinged with a second sliding sleeve, a sliding rail of the second sliding sleeve is equipped on the support rod, and axes of various hinge points are horizontally disposed and parallel to each other; and a top end of the support rod is securely connected to a camera assembly.

Preferably, the power source is a power motor, and a bidirectional screw rod is in power connection with an output shaft of the power source; and each of two threaded sections of the bidirectional screw rod is equipped with one moving block in a threaded manner, such that the two moving blocks and the bidirectional screw rod jointly form one linear action unit.

Preferably, the base spreading system further includes the top plate whose surface is parallel to the surface of the base plate and that is disposed above the base plate; the moving block is in a shape of a square block, the cantilever plate includes an upper suspension plate and a lower suspension plate, both the upper suspension plate and the lower suspension plate extend horizontally and are hinged on a top-end surface and a bottom-end surface of the moving block respectively; the top plate is also provided with a guide sliding slot, the vertical pillar on the upper suspension plate extends vertically upward to form a guide fit relationship with the guide sliding slot on the top plate, and the vertical pillar on the lower suspension plate extends vertically downward to form a guide fit relationship with the guide sliding slot on the base plate; and a reinforcing plate for structural strengthening is disposed between the upper suspension plate and the lower suspension plate.

Preferably, the top plate, the base plate, the moving block, the cantilever plate, and the walking assembly jointly form a base; front and rear ends of the base each are provided with a sensing portion for controlling a moving direction of the base; sensing terminals of two sensing portions located at a same end of the base are disposed horizontally and point to directions of two side walls of the cable tunnel respectively; and the walking assembly is a crawler wheel.

Preferably, two cantilever plates at a same end of the base plate are provided with synchronous gears meshing with each other synchronously.

Preferably, the jacking assembly includes a top block; a front end of the top block is securely hinged on a bottom end of a first swinging rod by using a first horizontal hinge shaft, and a top end of the first swinging rod is securely hinged on a front end of the base plate by using a second horizontal hinge shaft; and a rear end of the top block is hinged on a bottom end of a second swinging rod by using a third horizontal hinge shaft, and a top end of the second swinging rod is in power connection with an output shaft of a swing arm motor located at a tail end of the base plate.

Preferably, the top block are two straight-bars, and the two straight-bars the top block are securely connected to each other by using lateral tie rods, to form a horizontal square frame structure.

Preferably, the linear displacement unit includes a displacement motor, and a displacement screw rod coaxially securely connected to an output shaft of the displacement motor, and the displacement screw rod is equipped with the travel block in a threaded manner; the displacement motor is located behind the top plate, there is an extension frame that extends outward along a length direction of the base and is located behind the top plate, and the extension frame is provided with a hinge seat to hinge the bottom end of the first connecting rod; and a height of a hinge joint at the bottom end of the first connecting rod is higher than that of a hinge joint at the bottom end of the first rocker.

Preferably, a support block for supporting the support rod is disposed on the first connecting rod and close to the bottom end of the first connecting rod, and the support block is provided with a concave placement groove for placing the support rod.

Preferably, the camera assembly includes a camera seat, and a rotating block horizontally hinged on the camera seat, the rotating block is provided with a first torque motor, an output shaft of the first torque motor extends vertically upward and is securely connected to a camera to drive the camera to rotate, and the rotating block is driven by a second torque motor disposed on the camera set, to generate a pitching action.

The present disclosure has the following beneficial effects:

1) Considering a fire, a thick firewall is disposed every specified length in the cable tunnel, to divide the cable tunnel into tunnel units to achieve physical isolation in case of fire. However, considering a drainage problem, a drainage ditch is disposed at a midcourt line of the ground of the cable tunnel, and the drainage ditch passes through the firewall for drainage.

Based on the above status quo, the present disclosure considers designing a cable trench inspection robot, to realize a function of controlling a lifting height of the camera, to make corresponding on-site adjustments for different cable harness heights, thereby scanning and shooting bundled cables from a plurality of angles and positions, and finally ensuring a monitoring effect. In addition, on the premise of meeting the above basic requirements, a volume of the cable trench inspection robot can be synchronously minimized after the cable trench inspection robot is collapsed, so as to provide a basic guarantee for a subsequent through-wall operation of the cable tunnel inspection robot.

Specifically, on one hand, the present disclosure provides driving force by using the power source on the base plate, and uses the linear action unit as an action source and the guide sliding slot as a guide portion. In this way, when the moving blocks move towards and away from each other, the walking assemblies on a same side of the base plate can be forced to produce fitting and spreading actions relative to the base plate. On the other hand, the present disclosure uses the top plate as a carrier, uses the linear displacement unit as a driving source on the top plate, enables the first rocker, the first connecting rod, the second rocker, and the second connecting rod to jointly form a parallel double-crank-type imitated four-bar assembly, and then provides the support rod with the camera assembly on the imitated four-bar assembly. In this way, the fitting and spreading actions of the walking assembly cooperate with the jacking assembly, such that the present disclosure can realize dual action functions of photographing the cable while walking on the ground of the cable tunnel, and walking in the cable trench to pass through the firewall. In addition, the top plate with the linear displacement unit, the imitated four-bar assembly with a parallel double-crank function, and the support rod with the camera assembly jointly form a three-dimensional support system from bottom to top, and driven by the imitated four-bar assembly and the corresponding sliding sleeve, the system can be finally collapsed. When necessary, the driving source, namely, the linear displacement unit, drives the travel block to perform an action, to jack the imitated four-bar assembly and make a height of the camera assembly adjustable. During collapsing, the travel block performs a backhaul action and drives the imitated four-bar assembly to get down, to lower the camera assembly and finally minimize the volume. The travel block works reliably and stably.

The present disclosure can realize the through-wall operation by using the cable trench, thereby avoiding many use problems caused by the firewall, and efficiently completing a predetermined inspection task.

2) For the power source and the linear action unit, a gear rack may be driven by the motor or the like to enable the moving block to perform a linear action, a crank slider structure may be used to ensure a guide action function of the moving block, or a cylinder may even be used to drive the moving block on the guide rail to ensure an action effect. To make the cable trench inspection robot compact, the present disclosure preferably adopts the power motor and the bidirectional screw rod equipped with the moving blocks in the threaded manner to realize a compact assembling function of "one rod and two blocks", and finally make the whole system retract into a narrow cable trench and pass through the firewall accurately and reliably.

3) In practical use, a structure with a single base plate can preliminarily ensure stability of a spreading action of the cantilever plate. In order to further improve the stability, the present disclosure adopts a double-plate structure, in other words, the base plate and the top plate are used to form a plywood structure, to clamp the cantilever plate and the moving blocks between the two plates, and each of the moving blocks ensures accuracy of the guide action by using the two guide sliding slots. Based on the above structure, reliability of spreading and retraction actions of the cantilever plate can be significantly improved.

4) The reinforcing plate is conducive to further improving structural stiffness of a single cantilever plate, to better support the camera deployed in the present disclosure. The walking assembly may be a roller structure or another existing similar mechanism that can walk on the ground. The present disclosure preferably adopts the crawler wheel as the walking assembly to improve its practicability, thereby maximizing the use under a complex working condition in the cable tunnel.

5) The jacking assembly can jack the walking assembly when necessary, to upraise the walking assembly to the ground level of the cable tunnel or higher than the ground level of the cable tunnel, thereby facilitating subsequent spreading and walking operations, and ensuring that the walking assembly can be naturally placed on the ground of the cable tunnel after the system is spread. In the present disclosure, preferably, the base plate, the first swinging rod, the top block, and the second swinging rod are connected end to end to form an imitated four-bar mechanism, and then the second swinging rod is used as a driving rod, to realize an action effect of the whole imitated four-bar mechanism. Once the imitated four-bar mechanism generates an action, the top block can move towards or away from the base plate, and can also drive the walking assembly to go up and down. To improve support stability of the top block, the top block may be directly made of a flat plate, or may be constituted by two straight-bars that is connected by the lateral tie rod, as described in the present disclosure, to ensure cooperation adaptability to a rugged cable trench by using a frame mechanism.

6) For the linear displacement unit, the gear rack may be driven by the motor or the like to enable the travel block to perform a linear action, a crank slider structure may be used to ensure a guide action function of the travel block, or a cylinder may even be used to drive the travel block on the guide rail to ensure an action effect. To make the cable trench inspection robot reliable and compact, the present disclosure preferably adopts the displacement motor and the displacement screw rod to ensure the reciprocating action of the travel block. The height of the hinge joint at the bottom end of the first connecting rod is higher than that of the hinge joint at the bottom end of the first rocker. In this way, the whole mechanism is fully collapsed on the base when getting down and performing retraction, thereby effectively ensuring the minimum volume.

7) The deployment of the support block and the placement groove takes into account that the support rod is hinged and fit with the top end of the first connecting rod completely depending on its own stiffness, and relies on a jacking effect of the second rocker to ensure straightness of the support rod. When the whole mechanism gets down and retracts, because the top end of the support rod carries the heavy camera assembly, the support rod directly falls or may damage the camera assembly, or the support rod may be damaged due to impact. In the present disclosure, the support block is disposed, such that the support rod can just fall into the placement groove of the support block. This reliably protects the support rod and the camera assembly, and ensures placement reliability of the support rod when the overall structure has the minimum volume, to prevent a position deviation due to a bumpy road surface of the cable trench from affecting subsequent normal operation.

8) After the camera assembly is jacked to a predetermined height, driven by the second torque motor, the camera can also generate the pitching action, to ensure that the camera can always observe the cable horizontally in real time. In addition, the camera can also be driven by the first torque motor to rotate, to observe a fixed point from a plurality of angles, and observation accuracy and reliability of the camera can be significantly improved.

Figure 1:
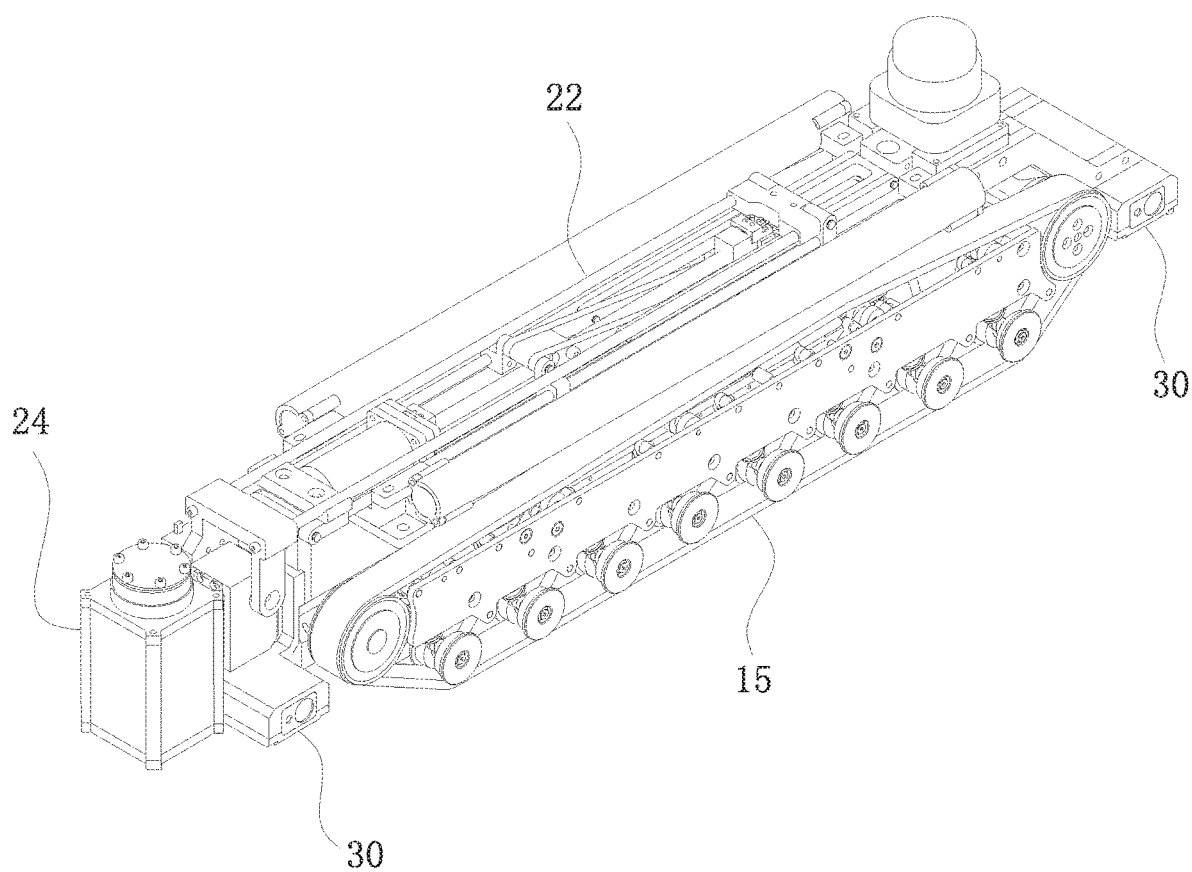
FIG. 1 and FIG. 2 are three-dimensional schematic structural diagrams of the present disclosure in a moving mode.

An actual correspondence between each reference numeral and a component name in the present disclosure is as follows:

11: base plate; 12: power source; 13: moving block; 14: cantilever plate

14a: upper suspension plate; 14b: lower suspension plate; 14c: reinforcing plate; 14d: vertical pillar 15: walking assembly; 16: jacking assembly 16a: top block; 16b: first swinging rod; 16c: second swinging rod 16d: swing arm motor; 16e: lateral tie rod 17: bidirectional screw rod; 18: top plate; 19: guide sliding slot 20: first vertical hinge shaft; 20a: second vertical hinge shaft; 20b: walking portion 21: travel block; 22: imitated four-bar assembly 22a: first rocker; 22b: first connecting rod; 22c: first sliding sleeve 22d: second connecting rod; 22e: second rocker; 22f: second sliding sleeve 23: support rod; 24: camera assembly 24a: camera seat; 24b: rotating block; 24c: camera; 24d: second torque motor 24e: first torque motor 25: displacement screw rod; 26: displacement motor 30: sensing portion; 40: extension frame; 50: support block; 51: placement groove; 60: synchronous gear

DETAILED DESCRIPTION

In order to facilitate an overall understanding of the present disclosure, a structure and a working mode of a specific embodiment of the whole cable trench inspection robot are described as follows:

As shown in FIG. 1 to FIG. 17, a cable trench inspection robot, namely, the present disclosure, mainly includes a base spreading system, and a camera lifting system disposed on the base spreading system.

1. Base Spreading System

As shown in FIG. 1 to FIG. 12, the base spreading system includes a spreading assembly configured to drive a walking assembly 15 to spread to walk on the ground of a cable tunnel in a moving mode, and drive the walking assembly 15 to stop the moving mode such that the walking assembly 15 retracts based on a width of the cable trench, and a jacking assembly 16 configured to make the whole system higher than the cable trench and retract the whole system into the cable trench.

Figure 8:
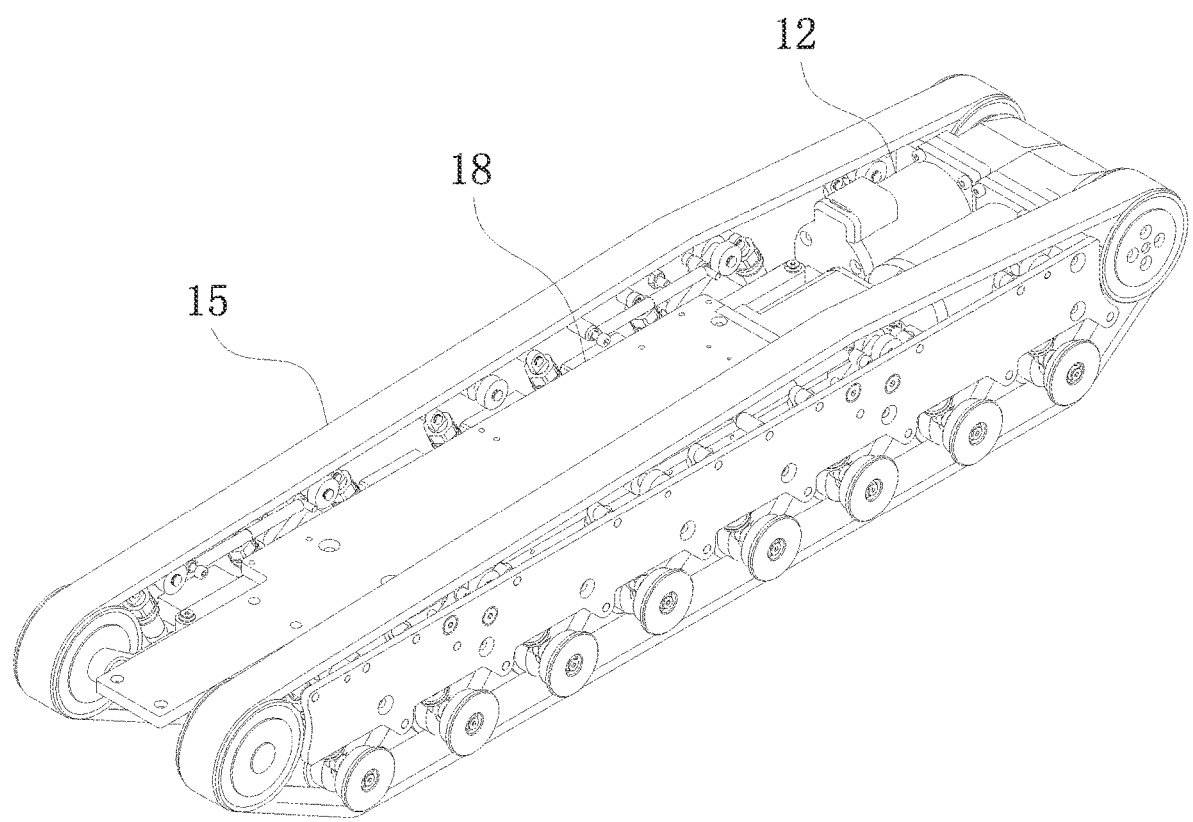
FIG. 8 is a three-dimensional schematic structural diagram of a base spreading system in a moving mode.
Figure 9:
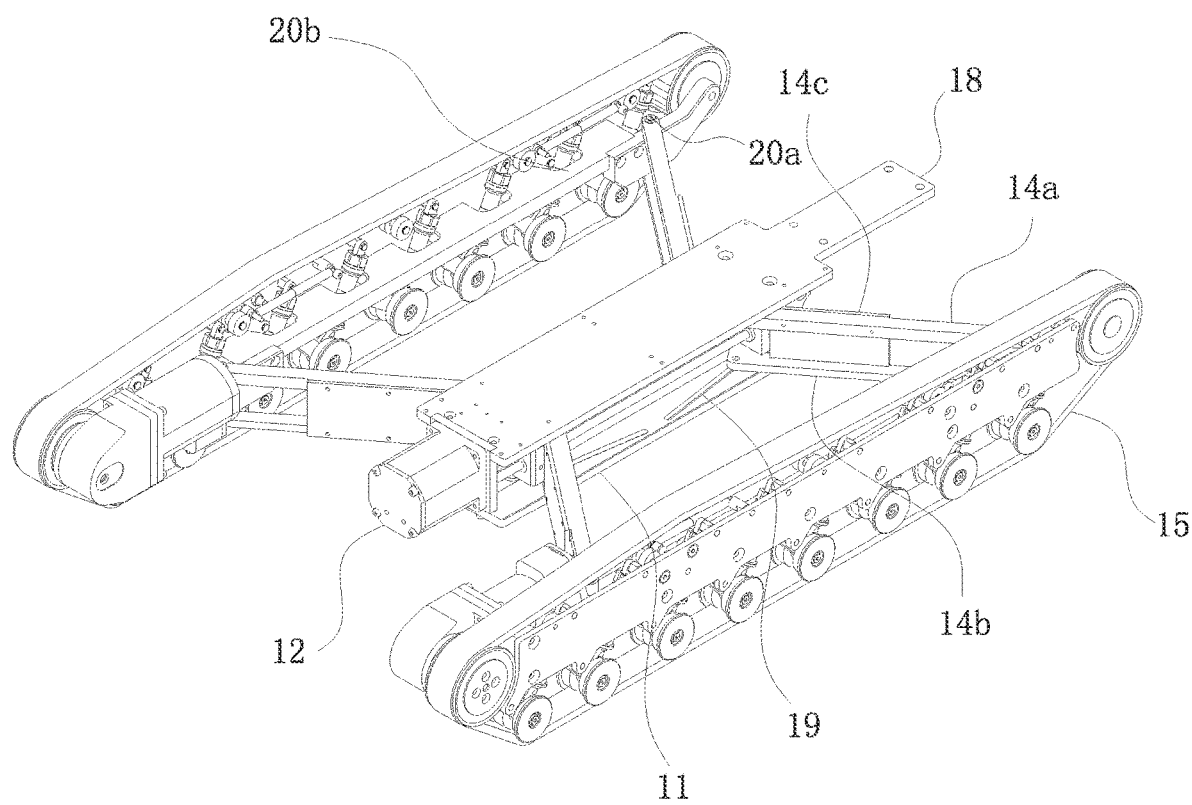
FIG. 9 is a three-dimensional schematic structural diagram of a base spreading system in a spread mode.

As shown in FIG. 9 to FIG. 12, the spreading assembly includes a group of top plates 18, a group of base plates 11, a group of drive motors, namely, power sources 12, two groups of bidirectional screw rods 17, four groups of moving blocks 13, and four cantilever plates 14. During actual assembling, both the top plate 18 and the base plate 11 are rectangular plates and their surfaces are disposed horizontally. A gap between the top plate 18 and the base plate 11 is used for disposing the drive motor, the bidirectional screw rod 17, the moving block 13, and the cantilever plate 14. The two groups of bidirectional screw rods 17 are arranged in parallel and parallel to a length direction of the base plate 11. Same ends of the two groups of bidirectional screw rods 17 are jointly in power connection with or meshed with a same group of drive motors by using gears. After the moving block 13 is equipped on a threaded section of the bidirectional screw rod 17, the moving block 13 is hinged with a fixed end of the cantilever plate 14 by using a first vertical hinge shaft, and a cantilever end of the cantilever plate 14 is hinged with a walking portion by using a second vertical hinge shaft. As shown in FIG. 8 and FIG. 9, the walking assembly 15 is a crawler wheel, and the cantilever end of the cantilever plate 14 directly forms a hinged fit relationship with a preset fixed block on the crawler wheel. Due to a length of the track wheel itself, two groups of cantilever plates 14 located on a same side of the base plate 11 can jointly cooperate with one group of track wheels to ensure stability and accuracy of the system during moving.

Figure 10:
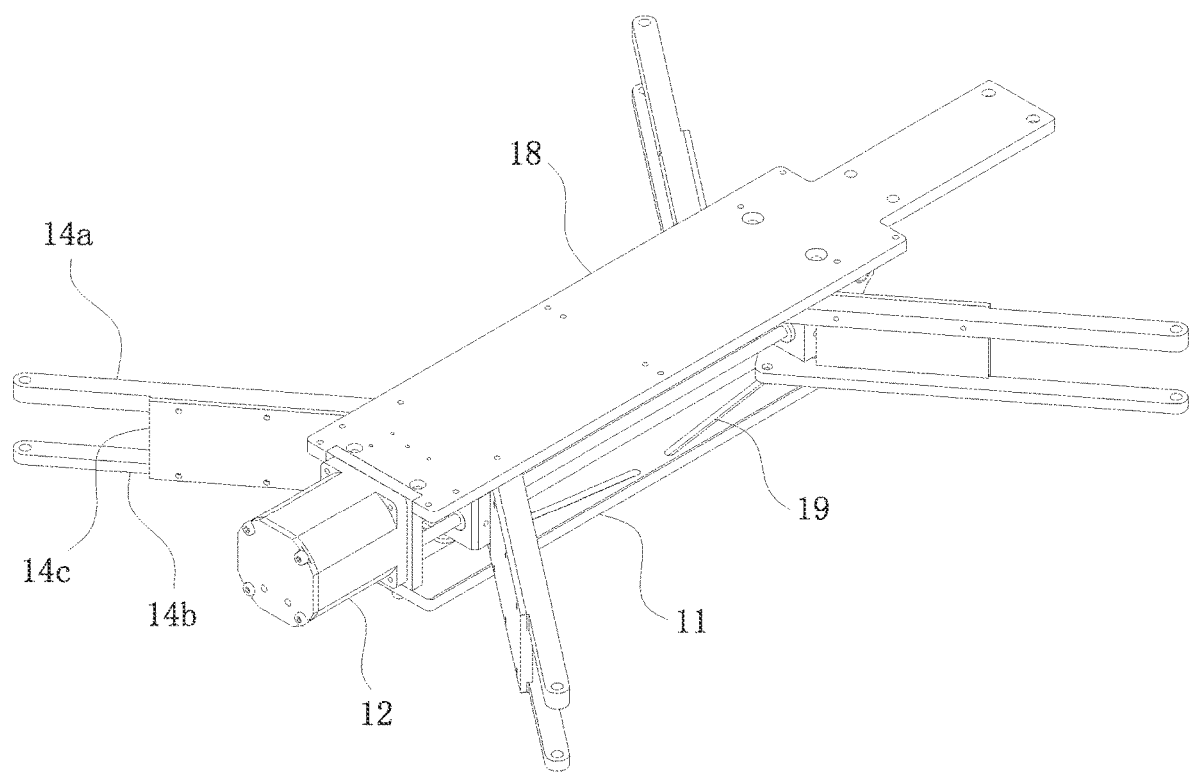
FIG. 10 is a three-dimensional schematic structural diagram of the structure shown in FIG. 9 after the walking assembly is removed.
Figure 11:
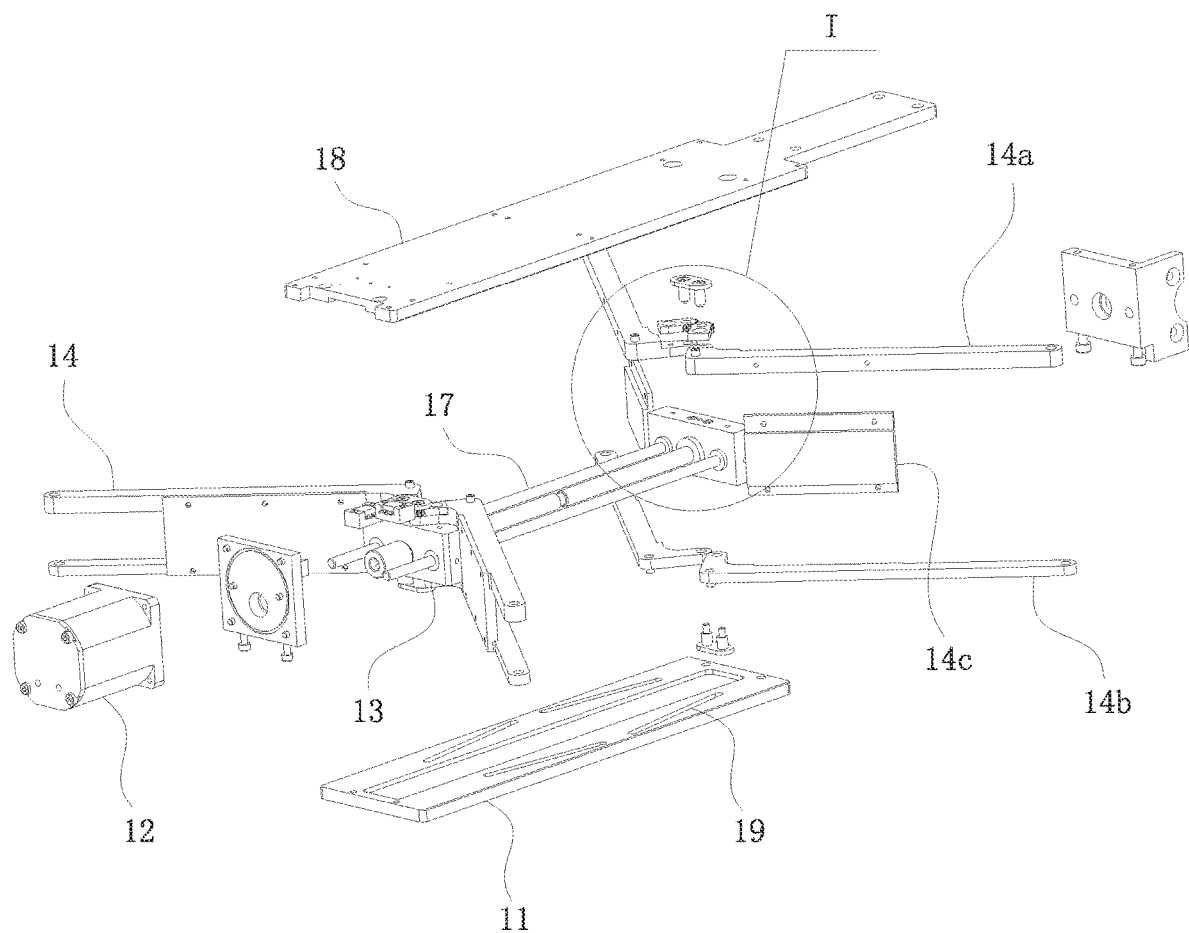
FIG. 11 is a structural exploded view of FIG. 10.
Figure 12:
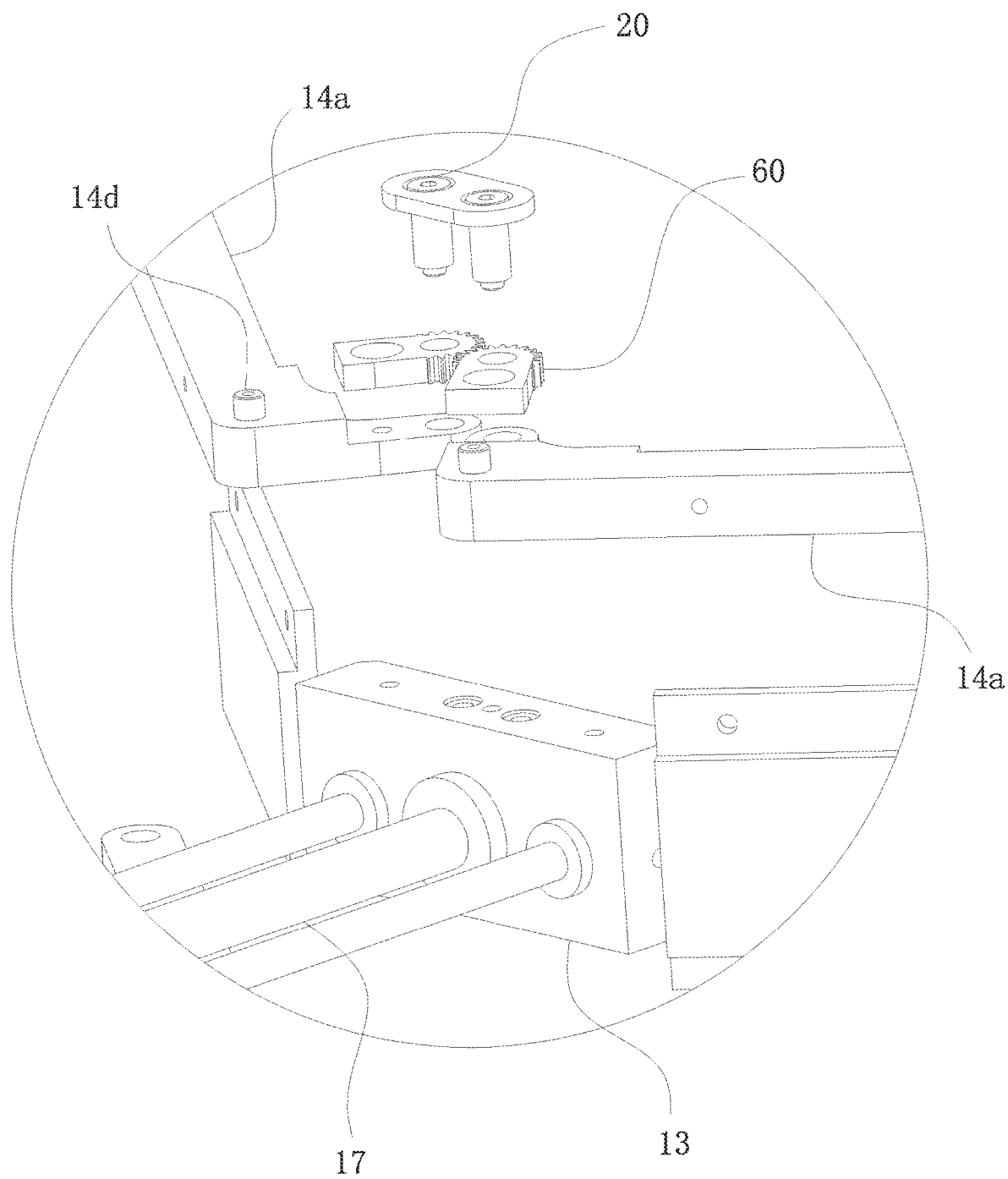
FIG. 12 is a partial enlarged diagram of part I in FIG. 11.

As shown in FIG. 10 and FIG. 11, the cantilever plate 14 includes an upper suspension plate 14a and a lower suspension plate 14b that are parallel to each other, and a reinforcing plate 14c for structural reinforcing is disposed between the upper suspension plate 14a and the lower suspension plate 14b. Both the upper suspension plate 14a and the lower suspension plate 14b extend horizontally and are hinged on a top-end surface and a bottom-end surface of the moving block 13 respectively. Both an upper surface of the base plate 11 and a lower surface of the top plate 18 each are provided with a guide sliding slot 19. As shown in FIG. 12, a vertical pillar 14d on the upper suspension plate 14a extends vertically upward to form a guide fit relationship with the guide sliding slot 19 on the top plate 18, and a vertical pillar 14d on the lower suspension plate 14b extends vertically downward to form a guide fit relationship with the guide sliding slot 19 on the base plate 11. In this way, when the drive motor drives the bidirectional screw rod 17 to rotate to further make the moving block 13 generate a reciprocating displacement along the threaded section of the bidirectional screw rod 17, the moving block 13 drives the cantilever plate 14 to swing laterally. The cantilever plate 14 and the crawler wheel form an integrated structure by using various hinge shafts. Therefore, driven by a linear action of the moving block 13, the cantilever plate 14 generates a follow-up action to drive the track wheel to retract or spread outward. Certainly, to ensure that actions of cantilever plates 14 on both sides of the base plate 11 are accurate and synchronous, as shown in FIG. 11 and FIG. 12, synchronous gears 60 may be disposed on the upper suspension plates 14a at a same end of the base plate 11, to realize action synchronization between the two cantilever plates 14 at a same end of the base plate 11 based on meshing of the synchronous gears 60.

Figure 6:
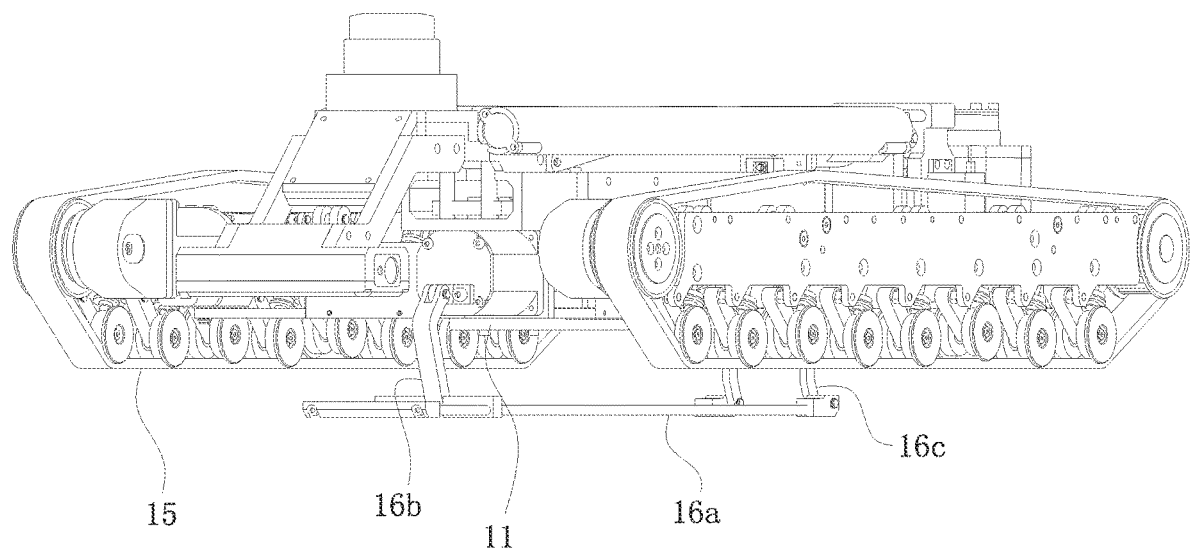
Figure 7:
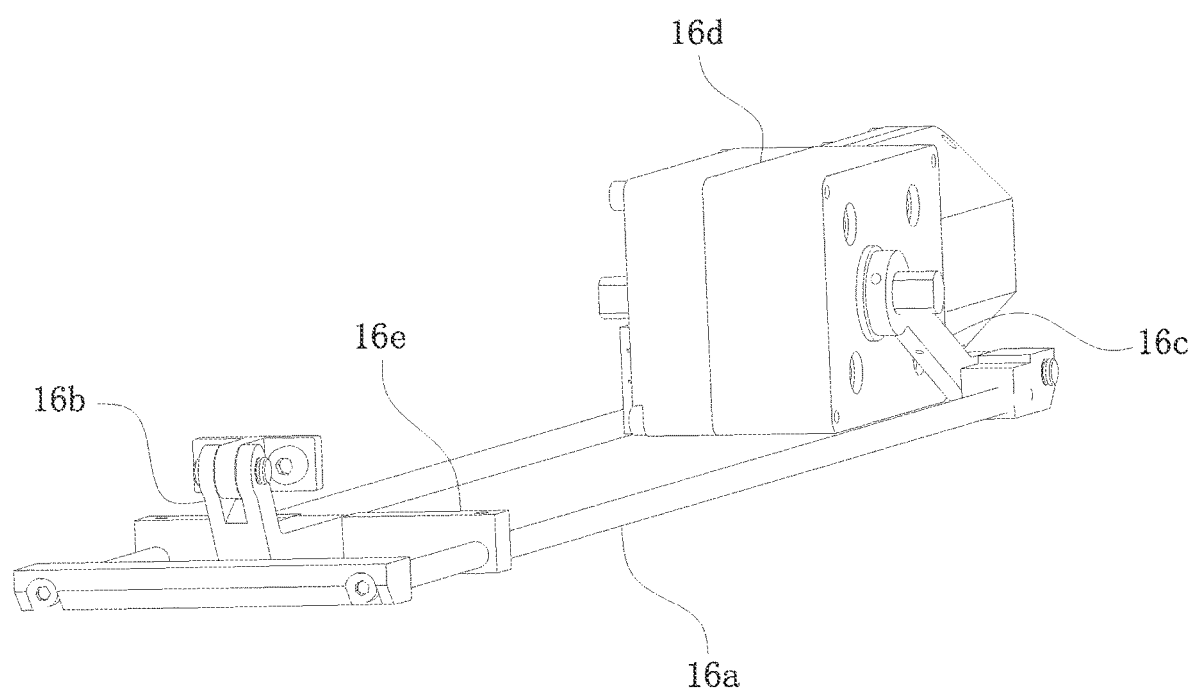
FIG. 7 is a three-dimensional schematic structural diagram of a jacking assembly.

As shown in FIG. 6 and FIG. 7, the jacking assembly 16 includes a four-bar mechanism formed by connecting the base plate 11, a first swinging rod 16b, a top block 16a, and a second swinging rod 16c end to end, and then the second swinging rod 16c is in power connection with an output shaft of a swing arm motor 16d to form a driving rod to realize an action effect of the whole four-bar mechanism. Once the four-bar mechanism generates an action, the top block 16a can move towards or away from the base plate 11, and can also drive the walking assembly 15 to go up and down. To improve support stability of the top block 16a, the top block 16a may be directly made of a flat plate, or may be constituted by two straight-bars that is connected by a lateral tie rod 16e, as described in the present disclosure. As shown in FIG. 7, the two top blocks 16a and the lateral tie rod 16e can form a square frame structure. Obviously, the square frame structure imposes a lower flatness requirement on a contact surface, and is especially suitable for a rugged cable trench environment.

As shown in FIG. 1 to FIG. 4, a sensing surface of a sensing portion 30 points to walls on both sides of the cable tunnel, to ensure, by using the sensing surface of the sensing portion 30, that distances from a base to the walls on both sides are always equal during moving along the cable tunnel, thereby finally achieving automatic centering and guidance of the present disclosure during moving along the cable tunnel. Details are not described herein.

2. Camera Lifting System

As shown in FIG. 1 to FIG. 5 and FIG. 13 to FIG. 17, the camera lifting system specifically includes a linear displacement assembly, an imitated four-bar assembly 22, and a camera assembly 24 that are disposed in sequence from bottom to top.

Figure 13:
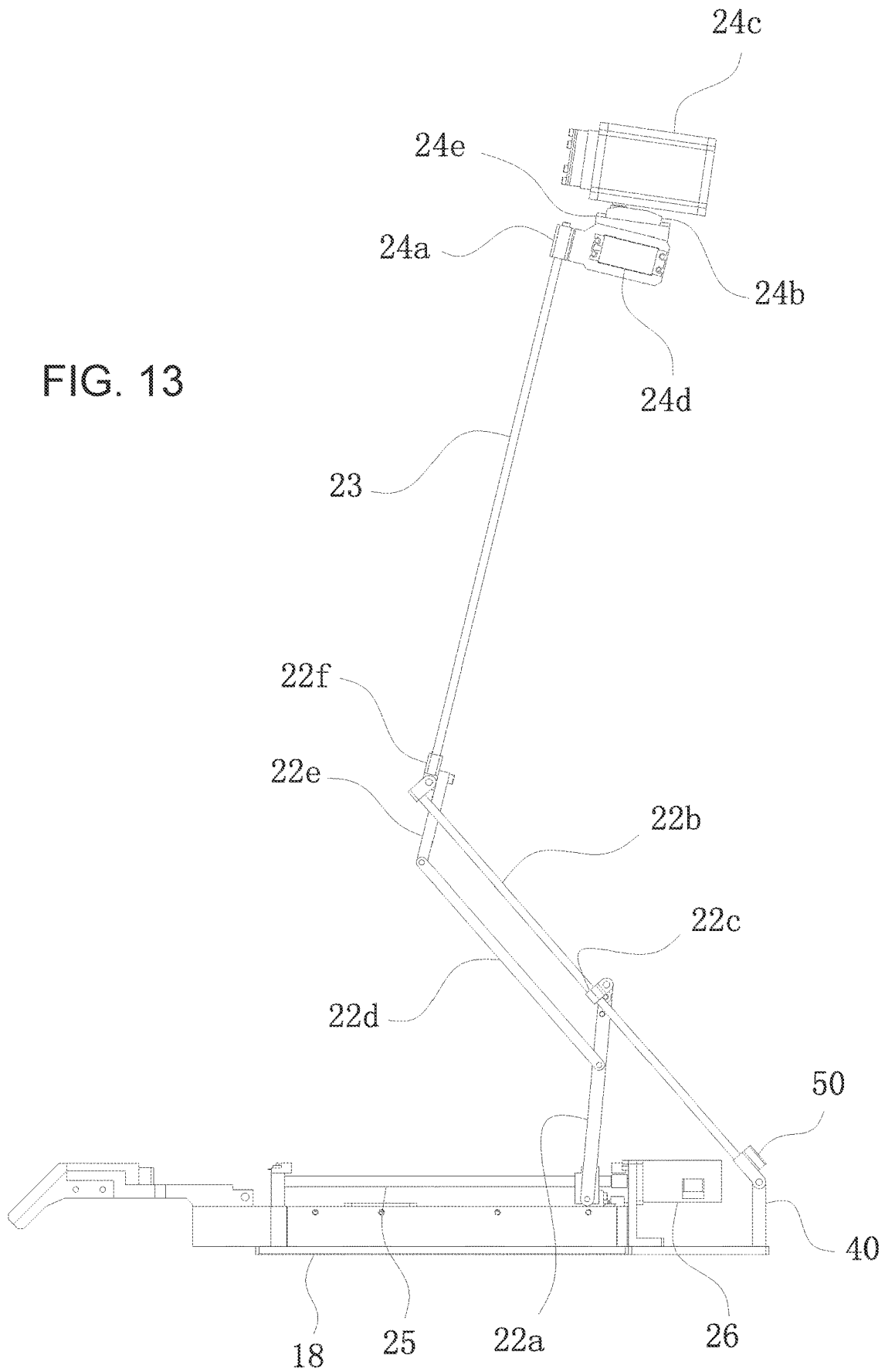
FIG. 13 is diagram of a camera lifting system in a spread mode.
Figure 14:
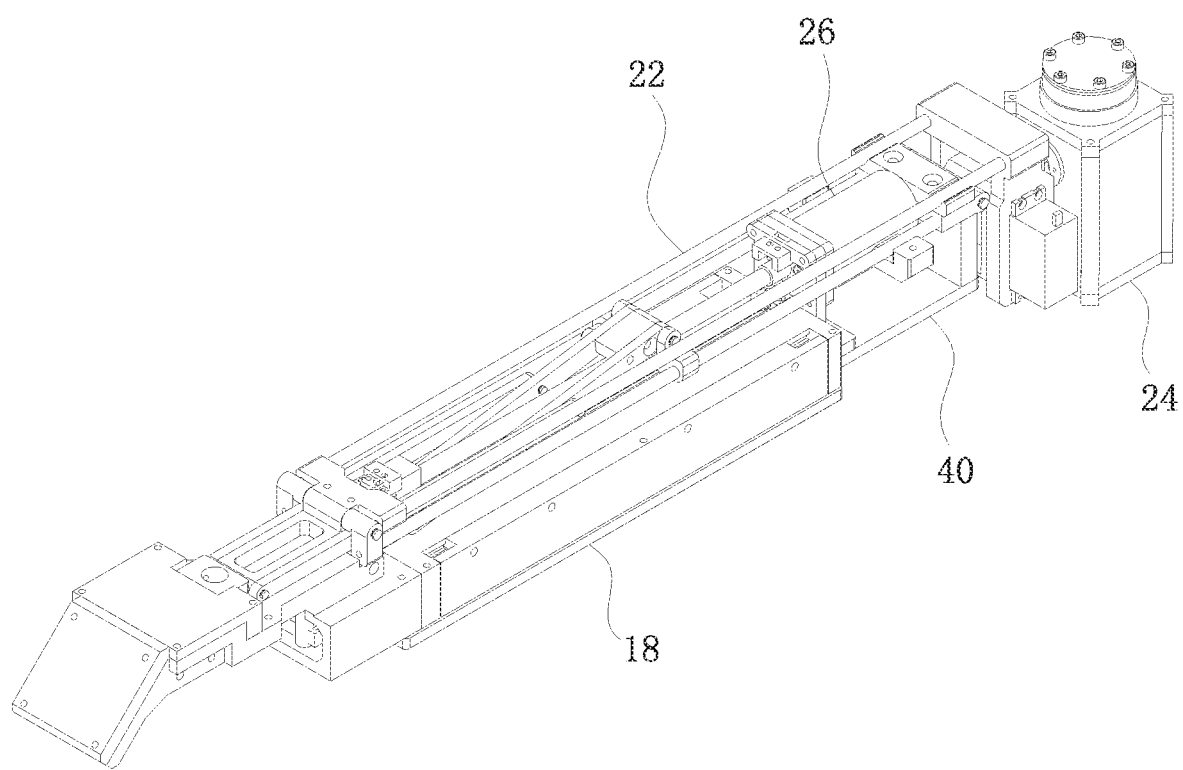
FIG. 14 and FIG. 16 are three-dimensional schematic structural diagrams of a camera lifting system in a moving mode.

As shown in FIG. 13, the linear displacement assembly includes a displacement screw rod 25 disposed on an upper surface of the top plate 18 and extending along a length direction of the upper surface of the top plate 18, and a displacement motor 26 is disposed at a tail end of the displacement screw rod 25 to perform a driving function. The displacement screw rod 25 is equipped with a travel block 21 in a threaded manner to drive, by using the drive motor, the displacement screw rod 25 to rotate, thereby achieving guided reciprocating movement functions of the travel block 21. As shown in FIG. 13 and FIG. 14, an extension frame 40 is further disposed behind the displacement motor 26 to support the imitated four-bar assembly 22 together with the top plate 18 on the base.

Figure 15:
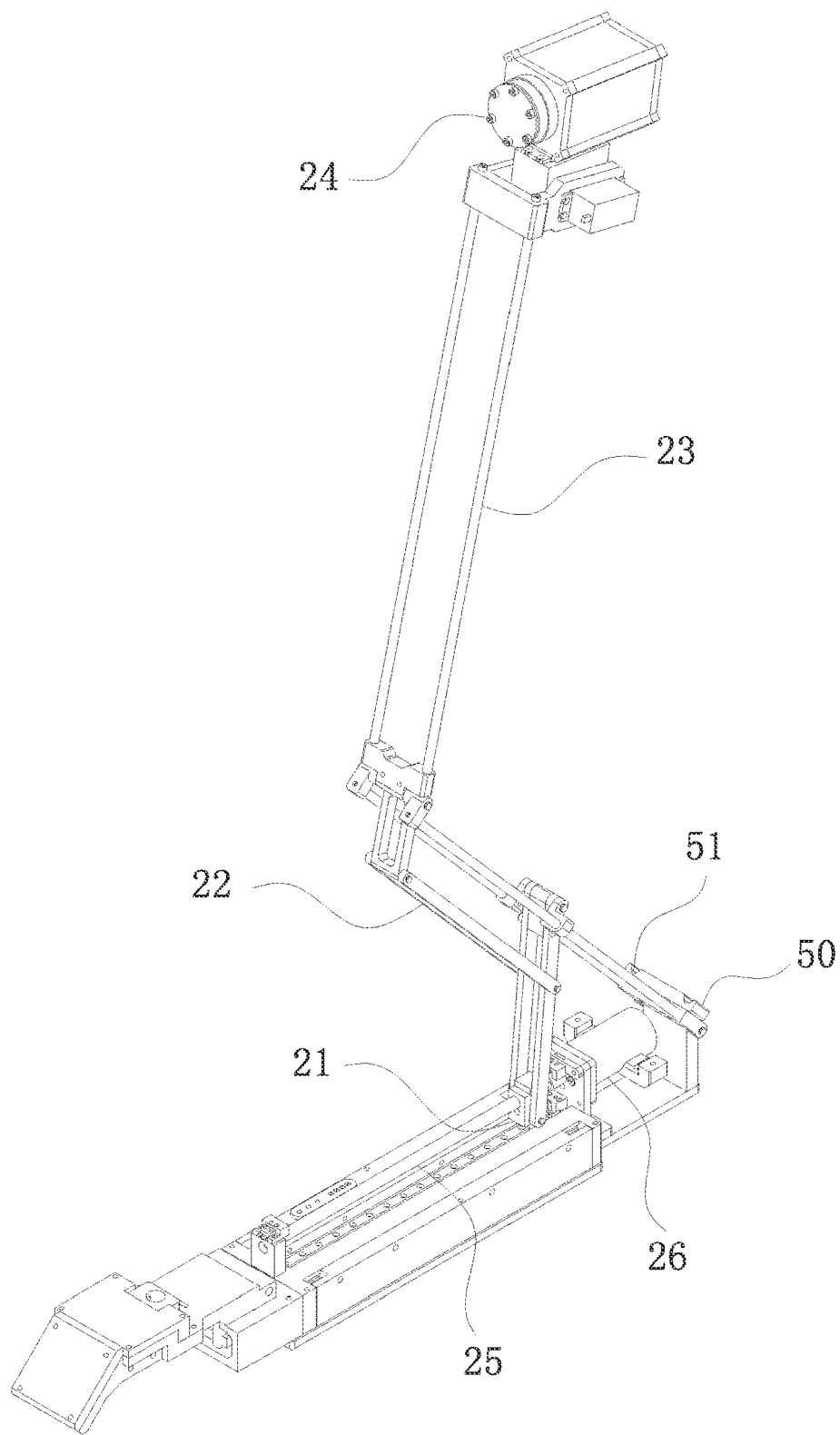
FIG. 15 and FIG. 17 are three-dimensional schematic structural diagrams of a camera lifting system in a spread mode.
Figure 16:
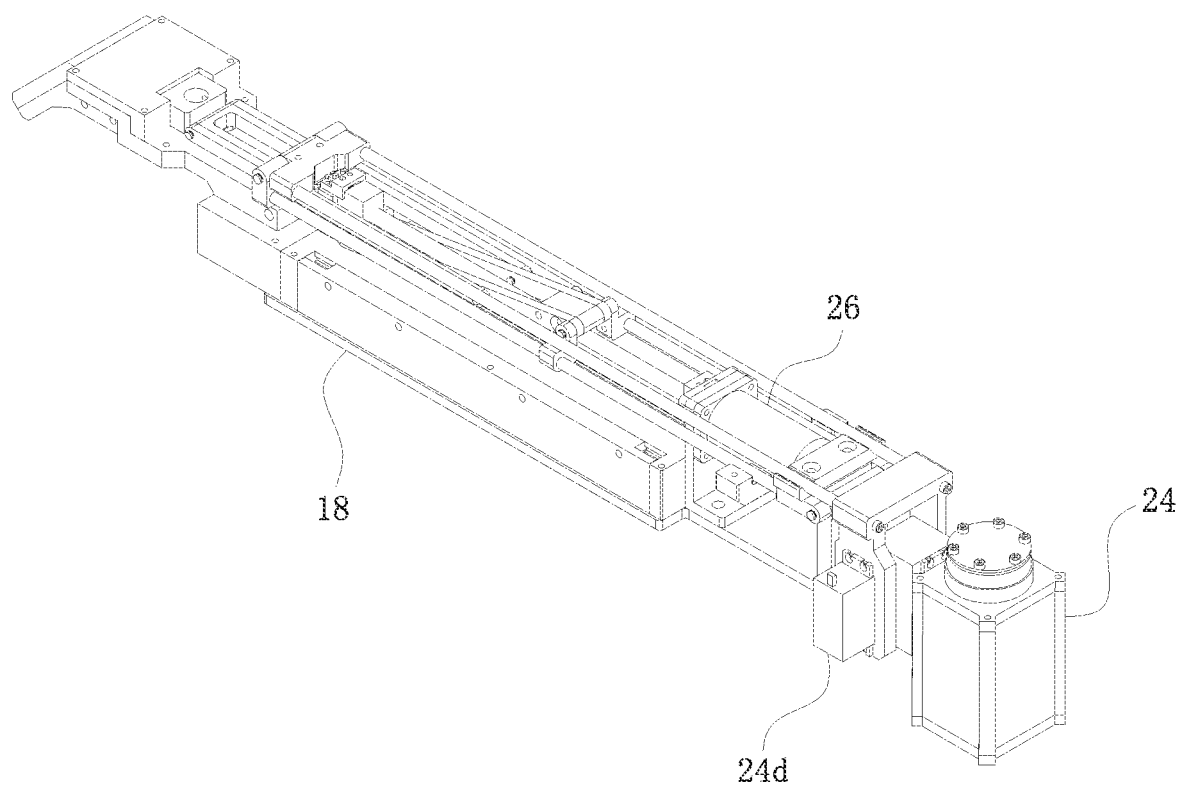
Figure 17:
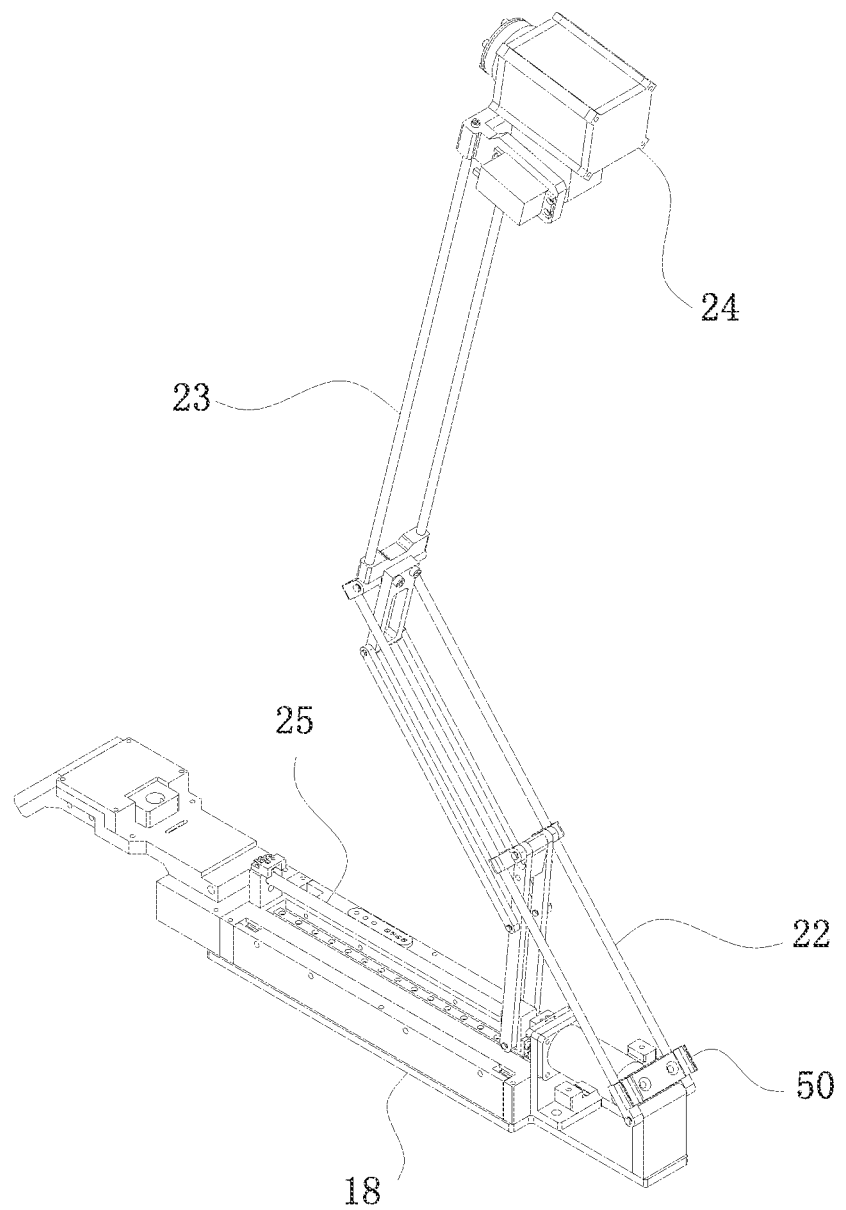

As shown in FIG. 13 to FIG. 17, the imitated four-bar assembly 22 includes a first rocker 22a, a second rocker 22e, a first connecting rod 22b, and a second connecting rod 22d. As its name implies, the imitated four-bar assembly 22 is structurally similar to a plane four-bar mechanism. However, as shown in FIG. 13, hinge joints on some rod bodies can slide relative to other rod bodies, to collapse and spread the whole camera lifting system. Specifically, a bottom end of the first rocker 22a is horizontally hinged with the travel block 21, and a top end of the first rocker 22a is sleeved on the first connecting rod 22b by using a first sliding sleeve 22c. A bottom end of the first connecting rod 22b is horizontally hinged on the extension frame 40, and a top end of the first connecting rod 22b is horizontally hinged on a bottom end of a support rod 23. A bottom end of the second connecting rod 22d is horizontally hinged with the first rocker 22a, and a top end of the second connecting rod 22d is horizontally hinged on a bottom end of the second rocker 22e. A top end of the second rocker 22e is sleeved on the support rod 23 by using a second sliding sleeve 22f. Axes of the above hinge points are parallel to each other. In this way, when the travel block 21 moves backward along the displacement screw rod 25, in other words, moves right as shown in FIG. 13, the first rocker 22a generates a jacking action to upraise the first connecting rod 22b. In addition, the second connecting rod 22d and the second rocker 22e generate a conjoint imitated four-bar action, to finally erect the support rod 23. In this case, as shown in FIG. 13, FIG. 15 and FIG. 17, the above rod bodies form a parallel double-crank structure similar to a structure in which opposite rods have a same length. When the travel block 21 moves forward along the displacement screw rod 25, accordingly, the first rocker 22a generates a lodging action to drive the first connecting rod 22b, the second connecting rod 22d, and the second rocker 22e to generate a follow-up action, to finally make the support rod 23 get down. When the support rod 23 is at a lowest position, it is stably placed on a placement groove 51 of a support block 50 of the first connecting rod 22b just because a hinge joint at the bottom end of the first connecting rod 22b is higher than that at the bottom end of the first rocker 22a, to ensure placement stability of the support rod 23.

After the camera assembly 24 is jacked to a predetermined height, driven by a second torque motor 24d, a camera 24c can also generate a pitching action, to ensure that the camera 24c can always observe the cable horizontally in real time. In addition, the camera 24c can also rotate following a rotating block 24b driven by a first torque motor, to observe a fixed point from a plurality of angles, and observation accuracy and reliability of the camera 24c can be significantly improved.

To further understand the present disclosure, a working process of the specific embodiment of the present disclosure is further described below with reference to FIG. 1 to FIG. 6.

The cable trench inspection robot in the present disclosure has a normal moving mode and a spread mode when necessary, to adapt to different working conditions.

1) Moving Mode

Figure 2:
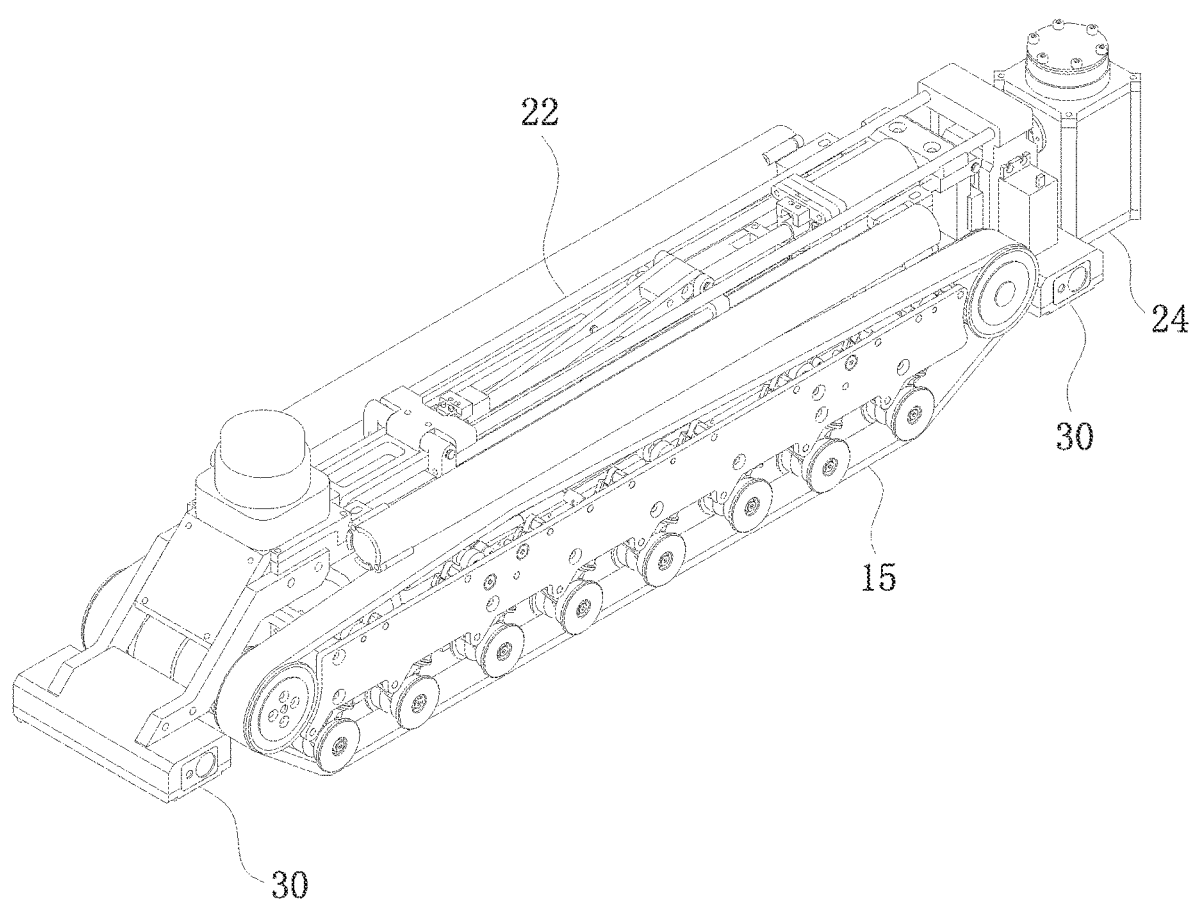

When the cable trench inspection robot is in the moving mode, as shown in FIG. 1 and FIG. 2, the displacement motor 26 in the camera lifting system rotates to drive the travel block 21 to move forward along the displacement screw rod 25. Accordingly, the first rocker 22a generates the lodging action to drive the first connecting rod 22b, the second connecting rod 22d, and the second rocker 22e to generate the follow-up action, to finally make the support rod 23 get down. When the support rod 23 is at the lowest position, it is stably placed on the placement groove 51 of the support block 50 of the first connecting rod 22b just because the hinge joint at the bottom end of the first connecting rod 22b is higher than that at the bottom end of the first rocker 22a. In addition, the jacking assembly 16 is in a collapsed mode and clings to the lower surface of the base plate 11 on the base, the spreading assembly performs an action based on the rotation of the drive motor, and the cantilever plate 14 drives the two groups of crawler wheels to move towards each other in opposite directions until the two groups of crawler wheels cling to a side portion of the base, as shown in FIG. 1 and FIG. 2, to complete a collapsing action. In this case, an action mode of the cable trench inspection robot is shown in FIG. 1 and FIG. 2. A width of the cable trench inspection robot is less than that of the cable trench, and a height of the cable trench inspection robot is less than that of an opening on the firewall. The cable trench inspection robot can be put into the cable trench as a whole, and can pass through the firewall directly along the opening on the firewall.

2) Spread Mode

Figure 5:
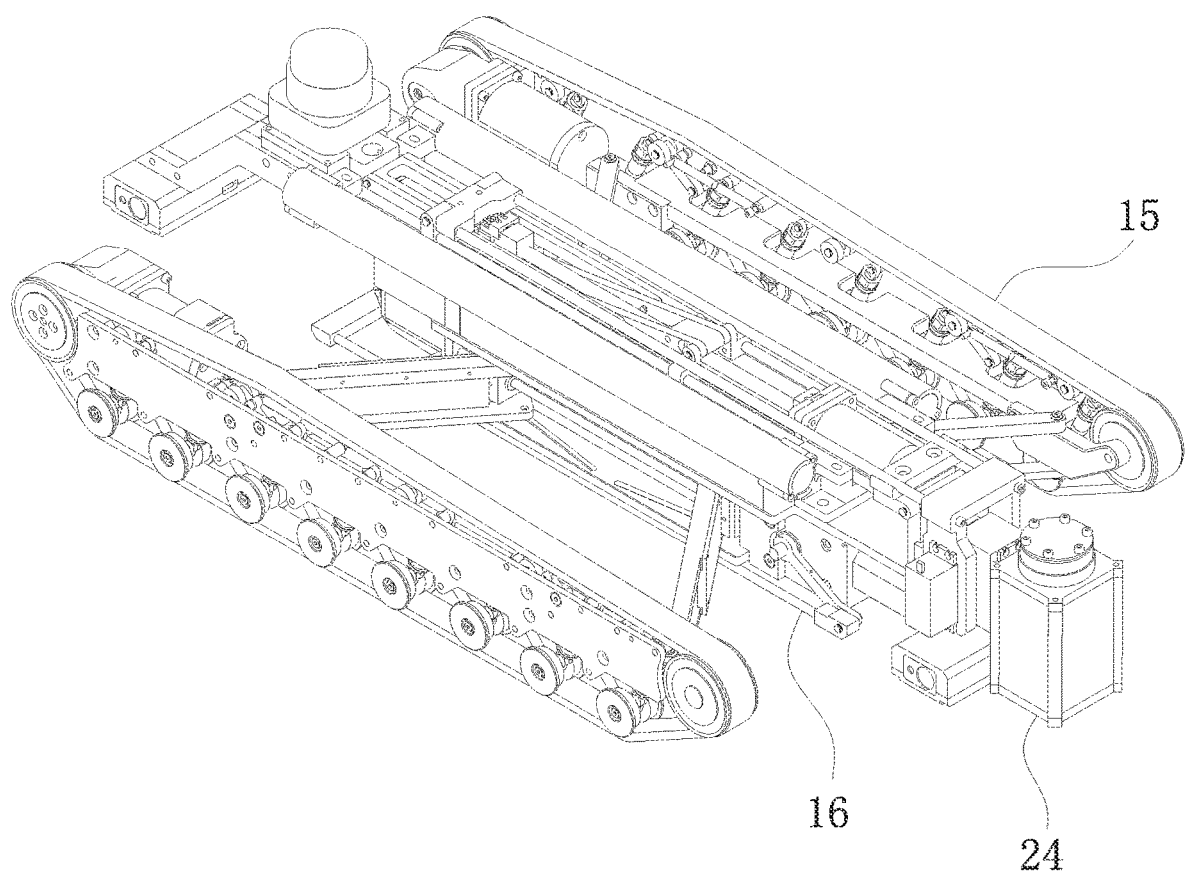
FIG. 5 and FIG. 6 are three-dimensional schematic structural diagrams of a base spreading system in a spread mode.

After the cable trench inspection robot passes through the firewall: the jacking assembly 16 first upraises the base and the components carried on the base, until a minimum height of the crawler wheel is higher than a ground level of the cable tunnel. Then, the spreading assembly starts to work, the drive motor starts to rotate and drives the bidirectional screw rod 17 to rotate, and the moving block 13 generates a linear displacement and drives the cantilever plate 14 to spread outward to enable the crawler wheels on both sides of the base to move away from each other. When the crawler wheels spread outward, they gradually cross the cable trench and finally are located directly above the ground of the cable tunnel. In this case, the jacking assembly 16 is reset, and the two groups of crawler wheels are stably placed on the ground of the cable tunnels on both sides of the cable trench under the action of gravity. In this case, statuses of the components of the present disclosure are shown in FIG. 5 and FIG. 6.

Figure 3:
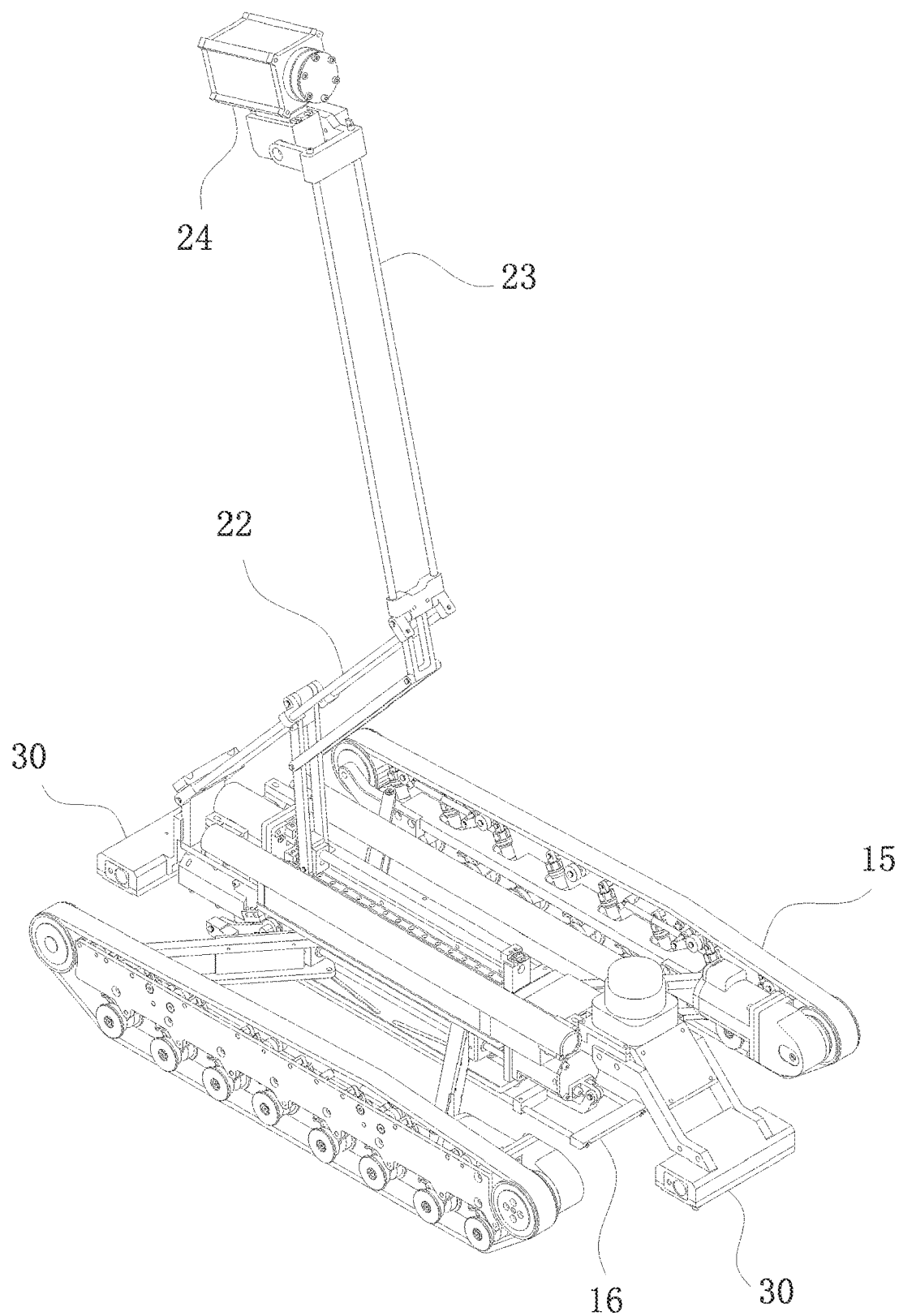
FIG. 3 and FIG. 4 are three-dimensional schematic structural diagrams of the present disclosure in a spread mode.
Figure 4:
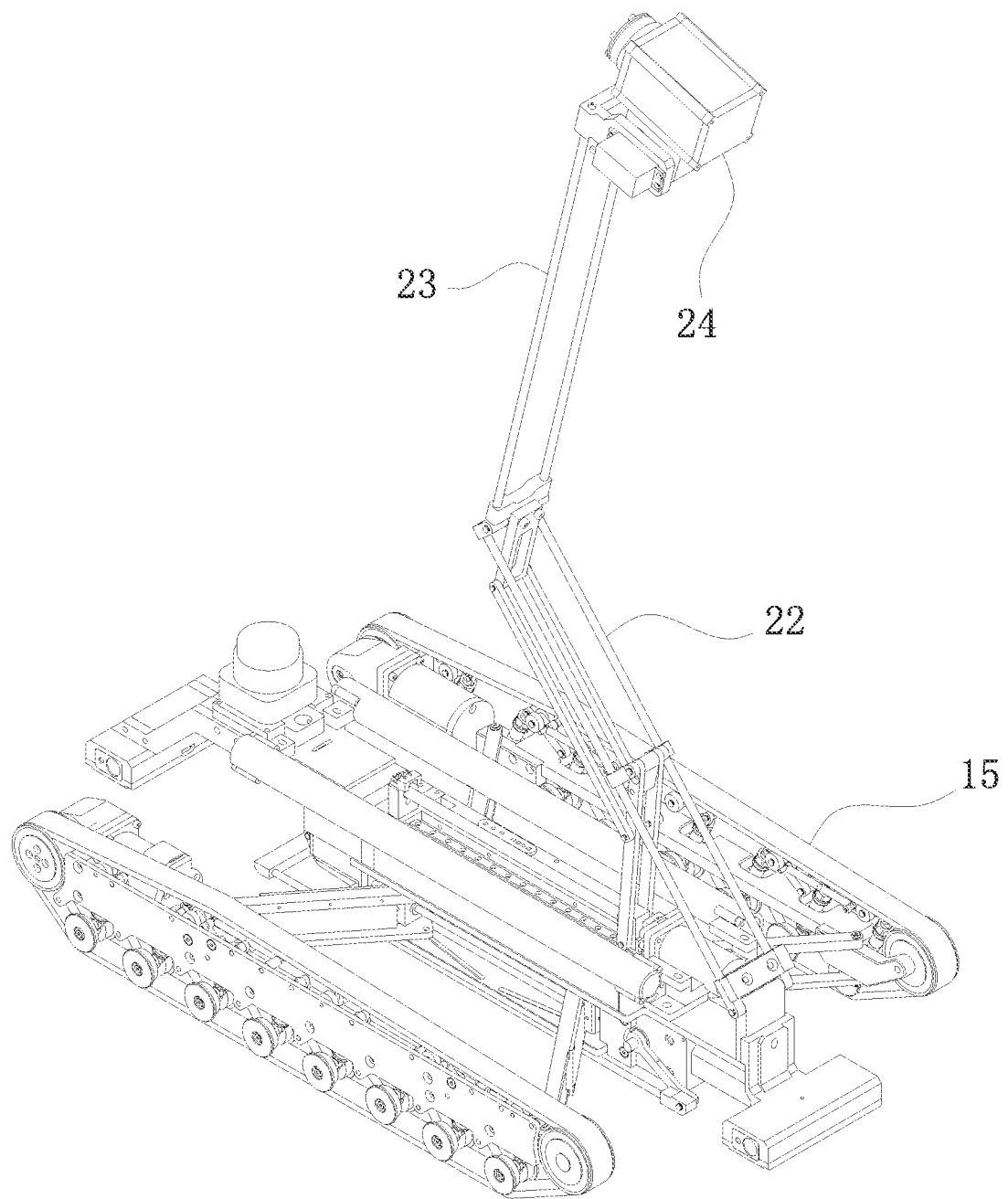

After that, as shown in FIG. 3 and FIG. 4, the displacement motor 26 in the camera lifting system rotates to drive the travel block 21 to move backward along the displacement screw rode 25. In this case, the first rocker 22a generates the jacking action to drive the first connecting rod 22b, the second connecting rod 22d, and the second rocker 22e to generate the follow-up action, to finally erect the support rod 23 gradually. When the support rod 23 is gradually erected, a ray assembly at a top end of the support rod 23 is upraised to a specified cable observation height. After the camera assembly 24 is jacked to the predetermined height, driven by the second torque motor 24d, the camera 24c generates the pitching action, to ensure that the camera 24c can always observe the cable horizontally in real time. In addition, the camera 24c can also rotate following the rotating block 24b driven by the first torque motor, to observe the fixed point from the plurality of angles.

After the above spreading action is completed, the crawler wheel is started, and the present disclosure can move along a current tunnel unit in the mode shown in FIG. 3 and FIG. 4, and execute a cable observation process of the current tunnel unit. After the tunnel unit journey, the cable trench inspection robot is reset to the moving mode shown in FIG. 1 and FIG. 2, and passes through the front firewall again, such that a next tunnel unit can be observed online in an automatic, labor-saving, convenient manner without additional operations.

Certainly, the foregoing description provides a specific embodiment of the present disclosure. In an actual operation, equivalently replacement of each power source 12, for example, replacing the rotation driving action of each motor by a drive cylinder or even a gear rack, replacement of the crawler wheel by another movable wheel body, or even replacement of the camera 24c by another induction structure such as a thermal imager can all be adopted. Conventional structural changes under these conventional ideas should fall within the protection scope of the present disclosure as equivalent or similar designs.

The invention claimed is:

1. A cable trench inspection robot, comprising a base spreading system, and a camera lifting system disposed on the base spreading system, wherein the base spreading system comprises a base plate (11) and a linear action unit arranged in parallel on the base plate (11), and the linear action unit comprises two moving blocks (13) that can be driven by a power source (12) to move towards and away from each other along a length direction of the base plate (11); each of the moving blocks (13) is hinged with a fixed end of a cantilever plate (14) by using a first vertical hinge shaft (20), a cantilever end of the cantilever plate (14) is hinged with a walking portion (20b) by using a second vertical hinge shaft (20a), and walking portions on a same side of the base plate (11) are securely connected to each other to form a group of walking assemblies (15); the cantilever plate (14) is further provided with a vertical pillar (14d), a position of the vertical pillar (14d) is spaced from a position of the first vertical hinge shaft (20), an upper surface of the base plate (11) is provided with a concave guide sliding slot (19), there is an included angle between a length direction of the guide sliding slot (19) and an action path of the moving block (13), and a corner tip of the included angle points to a moving direction when the moving blocks (13) move away from each other; and the base spreading system further comprises a jacking assembly (16) for jacking the walking assembly (15) from a cable trench to a height higher than or equal to a ground level of a cable tunnel; and the camera lifting system comprises a linear displacement unit, and the linear displacement unit comprises a travel block (21) disposed on a top plate (18) and capable of performing a reciprocating linear displacement along a length direction of the cable trench; the camera lifting system further comprises an imitated four-bar assembly (22), and a bottom end of a first rocker (22a) of the imitated four-bar assembly (22) extends downward and forms a hinged fit with the travel block (21); a bottom end of a first connecting rod (22b) is securely connected to an end portion of the top plate (18) behind the travel block (21), and a top end of the first connecting rod (22b) extends forward and forms a hinged fit with a bottom end of a support rod (23); a top end of the first rocker (22a) is hinged with a first sliding sleeve (22c), and a sliding rail of the first sliding sleeve (22c) is equipped on the first connecting rod (22b); a tail end of a second connecting rod (22d) is hinged on a middle portion of the first rocker (22a), a top end of the second connecting rod (22d) is hinged on a bottom end of a second rocker (22e), a top end of the second rocker (22e) is hinged with a second sliding sleeve (22f), a sliding rail of the second sliding sleeve (22f) is equipped on the support rod (23), and axes of various hinge points are horizontally disposed and parallel to each other; and a top end of the support rod (23) is securely connected to a camera assembly (24).

2. The cable trench inspection robot according to claim 1, wherein the power source (12) is a power motor, and a bidirectional screw rod (17) is in power connection with an output shaft of the power source (12); and each of two threaded sections of the bidirectional screw rod (17) is equipped with one moving block (13) in a threaded manner, such that the moving blocks (13) and the bidirectional screw rod (17) jointly form one linear action unit.

3. The cable trench inspection robot according to claim 1, wherein the base spreading system further comprises the top plate (18) whose surface is parallel to the surface of the base plate (11) and that is disposed above the base plate (11); the moving block (13) is in a shape of a square block, the cantilever plate (14) comprises an upper suspension plate (14a) and a lower suspension plate (14b), both the upper suspension plate (14a) and the lower suspension plate (14b) extend horizontally and are hinged on a top-end surface and a bottom-end surface of the moving block (13) respectively; the top plate (18) is also provided with a guide sliding slot (19), the vertical pillar (14d) on the upper suspension plate (14a) extends vertically upward to form a guide fit relationship with the guide sliding slot (19) on the top plate (18), and the vertical pillar (14d) on the lower suspension plate (14b) extends vertically downward to form a guide fit relationship with the guide sliding slot (19) on the base plate (11); and a reinforcing plate (14c) for structural strengthening is disposed between the upper suspension plate (14a) and the lower suspension plate (14b).

4. The cable trench inspection robot according to claim 3, wherein the top plate (18), the base plate (11), the moving block (13), the cantilever plate (14), and the walking assembly (15) jointly form a base; front and rear ends of the base each are provided with a sensing portion (30) for controlling a moving direction of the base; sensing terminals of two sensing portions (30) located at a same end of the base are disposed horizontally and point to directions of two side walls of the cable tunnel respectively; and the walking assembly (15) is a crawler wheel.

5. The cable trench inspection robot according to claim 3, wherein two cantilever plates (14) at a same end of the base plate (11) are provided with synchronous gears (60) meshing with each other synchronously.

6. The cable trench inspection robot according to claim 1, wherein the jacking assembly (16) comprises a top block (16a); a front end of the top block (16a) is securely hinged on a bottom end of a first swinging rod (16b) by using a first horizontal hinge shaft, and a top end of the first swinging rod (16b) is securely hinged on a front end of the base plate (11) by using a second horizontal hinge shaft; and a rear end of the top block (16a) is hinged on a bottom end of a second swinging rod (16c) by using a third horizontal hinge shaft, and a top end of the second swinging rod (16c) is in power connection with an output shaft of a swing arm motor (16d) located at a tail end of the base plate (11).

7. The cable trench inspection robot according to claim 6, wherein the top block (16a) comprises two straight-bars, and the two straight bars of the top block (16a) are securely connected to each other by using lateral tie rods (16e), to form a horizontal square frame structure.

8. The cable trench inspection robot according to claim 1, wherein the linear displacement unit further comprises a displacement motor (26), and a displacement screw rod (25) coaxially securely connected to an output shaft of the displacement motor (26), and the displacement screw rod (25) is equipped with the travel block (21) in a threaded manner; the displacement motor (26) is located behind the top plate (18), an extension frame (40) that extends outward along a length direction of the base is located behind the top plate (18), and the extension frame (40) is provided with a hinge seat to hinge the bottom end of the first connecting rod (22b); and a height of a hinge joint at the bottom end of the first connecting rod (22b) is higher than that of a hinge joint at the bottom end of the first rocker (22a).

9. The cable trench inspection robot according to claim 8, wherein a support block (50) for supporting the support rod (23) is disposed on the first connecting rod (22b) and close to the bottom end of the first connecting rod (22b), and the support block (50) is provided with a concave placement groove (51) for placing the support rod (23).

10. The cable trench inspection robot according to claim 1, wherein the camera assembly (24) comprises a camera seat (24a) and a rotating block (24b) horizontally hinged on the camera seat (24a), the rotating block (24b) is provided with a first torque motor (24e), an output shaft of the first torque motor extends vertically upward and is securely connected to a camera (24c) to drive the camera (24c) to rotate, and the rotating block (24b) is driven by a second torque motor (24d) disposed on the camera set (24a), to generate a pitching action.

11. The cable trench inspection robot according to claim 2, wherein the base spreading system further comprises the top plate (18) whose surface is parallel to the surface of the base plate (11) and that is disposed above the base plate (11); the moving block (13) is in a shape of a square block, the cantilever plate (14) comprises an upper suspension plate (14a) and a lower suspension plate (14b), both the upper suspension plate (14a) and the lower suspension plate (14b) extend horizontally and are hinged on a top-end surface and a bottom-end surface of the moving block (13) respectively; the top plate (18) is also provided with a guide sliding slot (19), the vertical pillar (14d) on the upper suspension plate (14a) extends vertically upward to form a guide fit relationship with the guide sliding slot (19) on the top plate (18), and the vertical pillar (14d) on the lower suspension plate (14b) extends vertically downward to form a guide fit relationship with the guide sliding slot (19) on the base plate (11); and a reinforcing plate (14c) for structural strengthening is disposed between the upper suspension plate (14a) and the lower suspension plate (14b).

12. The cable trench inspection robot according to claim 2, wherein the jacking assembly (16) comprises a top block (16a); a front end of the top block (16a) is securely hinged on a bottom end of a first swinging rod (16b) by using a first horizontal hinge shaft, and a top end of the first swinging rod (16b) is securely hinged on a front end of the base plate (11) by using a second horizontal hinge shaft; and a rear end of the top block (16a) is hinged on a bottom end of a second swinging rod (16c) by using a third horizontal hinge shaft, and a top end of the second swinging rod (16c) is in power connection with an output shaft of a swing arm motor (16d) located at a tail end of the base plate (11).

13. The cable trench inspection robot according to claim 2, wherein the linear displacement unit further comprises a displacement motor (26), and a displacement screw rod (25) coaxially securely connected to an output shaft of the displacement motor (26), and the displacement screw rod (25) is equipped with the travel block (21) in a threaded manner; the displacement motor (26) is located behind the top plate (18), an extension frame (40) that extends outward along a length direction of the base is located behind the top plate (18), and the extension frame (40) is provided with a hinge seat to hinge the bottom end of the first connecting rod (22b); and a height of a hinge joint at the bottom end of the first connecting rod (22b) is higher than that of a hinge joint at the bottom end of the first rocker (22a).

14. The cable trench inspection robot according to claim 2, wherein the camera assembly (24) comprises a camera seat (24a) and a rotating block (24b) horizontally hinged on the camera seat (24a), the rotating block (24b) is provided with a first torque motor (24e), an output shaft of the first torque motor extends vertically upward and is securely connected to a camera (24c) to drive the camera (24c) to rotate, and the rotating block (24b) is driven by a second torque motor (24d) disposed on the camera set (24a), to generate a pitching action.

\* \* \* \* \*